United States Patent Office 3,748,102
Patented July 24, 1973

3,748,102
CESIUM DIDEUTERIUM ARSENATE CRYSTAL-
LIZATION PROCESS AND SOLUTION
Ratan Shankar Adhav, 8 Durham St. E.,
Lindsay, Ontario, Canada
No Drawing. Filed Nov. 30, 1970, Ser. No. 93,868
Claims priority, application Canada, Dec. 19, 1969,
70,405
Int. Cl. B01j 17/04; C01b 27/02
U.S. Cl. 23—301 R                                3 Claims

ABSTRACT OF THE DISCLOSURE

In the present application there is disclosed a process for the production of crystals of cesium dideuterium arsenate of unusually large size and which crystals have unexpected electro-optical properties, particularly useful for laser applications as light modulators and Q switches. In the process sodium tetraborate is used as a catalyst and crystals having cross-sections of the order of one inch or more are obtained using a conventional Holden rotary crystallizer.

---

The present invention relates to the manufacture of crystals of cesium dideuterium arsenate and a crystals formed pursuant to this process. These crystals are particularly useful in electro-optic and piezo-electric applications, possessing particularly desirable electro-optical properties making them desirable devices for use as light modulators and Q-switches for laser applications. In practicing the process of the present invention it is possible to produce crystals of cesium dideuterium arsenate which are substantially larger than any crystals previously obtainable, and are of optical grade. Large crystal cross-sections of the order of 1 inch are required for laser optics applications and prior to the present invention it has not been possible to grow crystals of cesium dideuterium arsenate to this size which were optically acceptable.

In accordance with the present invention crystals of cesium dideuterium arsenate may be grown on 0° Z cut seeds of cesium dideuterium arsenate from a saturated heavy water solution of cesium dideuterium arsenate which has had its pH adjusted to the range of about 6 to 8 by the addition of cesium carbonate, and which contains approximately 10 grams per litre of solution of sodium tetraborate. These seeds are immersed in the solution and are moved relatively to the solution while the temperature of the solution is gradually decreased to maintain a saturated state while the cesium dideuterium arsenate is crystallizing on the seeds. A preferred apparatus for carrying out this process is the Holden rotary crystallizer which is a generally cylindrical tank having a spider centrally arranged in the tank on which the seeds are mounted. The spider is rotated at approximately three revolutions per minute, the direction of rotation being reversed from time to time. Pursuant to the present invention, crystals having a size of approximately 2×2 cm. in cross-section and length of 8 cm., may be grown in three to four weeks.

It will be appreciated that cesium dideuterium arsenate is not an off the shelf chemical item, and it is necessary to prepare the starting materials for the solution from commercially available chemicals. Thus the cesium dideuterium arsenate may be prepared by making deuterated arsenic acid and reacting the deuterated arsenic acid with cesium carbonate. The applicant has prepared deuterated arsenic acid or dideuterium arsenate by heating reagent grade arsenic pentoxide ($As_2O_5$) in commercial grade heavy water ($D_2O$) at 80° C. for 24 hours. The resulting product was then filtered through a 3 micron vacuum glass filter. Pure grade cesium carbonate puchased from Kawecki Chemicals was heated to 200° C. for 24 hours to remove moisture, was then cooled and reacted with the deuterated arsenic acid to give cesium dideuterium arsenate and heavy water. The pH of the cesium dideuterium arsenate was then adjusted by the addition of cesium carbonate to a value of between 6 and 8 and the solution was again filtered through the 3 micron vacuum glass filter. Sodium tetraborate was added to the solution in the proportion of 10 grams per litre of the solution.

In order to grow crystals of cesium dideuterium arsenate a Holden rotary crystallizer was used. 0° Z cut seeds are mounted on the spider of the crystallizer with 6 to 8 seeds in a litre tank, these seeds having a 2 cm. by 2 cm. cross section. The temperature of the seeds is of course equalized to the temperature of the solution before the seeds are immersed in the tank, to avoid thermal shock.. A typical starting temperature for the growth of crystals is approximately 50° C. and the temeprature is decreased by approximately ½° per day, depending on the number and size of seeds and the volume of solution. The control of temperature with time can be calculated from known data on solubility. The spider of the crystallizer is rotated in alternate direction by a suitable mechanical drive at a rate of, for example, 3 r.p.m. The crystals grow on the seeds and the growth may be stopped by removing the crystals from the solution when the appropriate size has been reached. Typically the crystals are grown for a period of approximately one month to attain the cross-section of 2×2 cms. and the length of 8 cms.

When the growth of a set of crystals is completed the solution in which the crystals were grown may be regenerated for further crystal growth by weighing the grown crystals and adding to the solution a sufficient quantity of cesium dideuterium arsenate prepared as described above to make up for the weight loss. The solution is then ready to be reused for a successive cycle of crystal growth.

It will be appreciated that the cesium dideuterium arsenate crystals grown in accordance with the present invention are extremely useful for electro-optical applications because these crystals possess the important property that the half-way retardation voltage is approximately ½ the voltage of any substance previously used as a light modulator, as shown by the following table:

TABLE NO. 1

| Crystalline substance: | Half-wave voltage, kv. |
|---|---|
| $NH_4H_2PO_4$ | 9.20 |
| $ND_4D_2PO_4$ | 6.55 |
| $KH_2PO_4$ | 7.45 |
| $KD_2PO_4$ | 3.85 |
| $RbH_2PO_4$ | 5.15 |
| $KH_2AsO_4$ | 6.50 |
| $KD_2AsO_4$ | 3.95 |
| $RbH_2AsO_4$ | 4.85 |
| $RbD_2AsO_4$ | 3.40 |
| $CsH_2AsO_4$ | 3.80 |
| $CsD_2AsO_4$ | 1.95 |

The embodiments of the invention in which an exclusive property or privilege is claimed are defined as follows:

1. A process for growing crystals of cesium dideuterium arsenate comprising preparing a saturated solution of cesium dideuterium arsenate in heavy water, adjusting the pH of the solution to be between 6 and 8 by the addition of cesium carbonate, adding to said solution sodium tetraborate in the proportion of about 10 gms. of sodium tetraborate per litre of solution, placing said solution in a Holden Rotary Crystallizer, attaching 0° Z cut seeds to the spider of said crystallizer, immersing said seeds in said solution and gradually decreasing the temperature of said solution while rotating said seeds to grow crystals on said seeds.

2. A process for growing crystals of cesium dideuterium arsenate from a saturated solution of cesium dideuterium arsenate in heavy water comprising adjusting the pH of said solution to be between 6 and 8, adding to said solution sodium tetraborate in the amount of about 10 gms. of sodium tetraborate to one litre of solution, inserting seeds of cesium dideuterium arsenate in said solution, moving said seeds with respect to said solution, and gradually decreasing the temperature of said solution to cause crystals to be formed on said seeds.

3. A solution for growing crystals of cesium dideuterium arsenate comprising heavy water
   cesium dideuterium arsenate—1800 gms. per litre of heavy water
   cesium carbonate to adjust pH to 6 to 8
   sodium tetraborate 10 gms. per litre of solution.

References Cited

UNITED STATES PATENTS

| | | | |
|---|---|---|---|
| 2,449,484 | 9/1948 | Jaffe | 252—62.9 |
| 2,543,071 | 2/1951 | Slawson | 23—301 |
| 2,546,305 | 3/1951 | Jaffe et al. | 23—53 |
| 2,669,666 | 2/1954 | Mason et al. | 23—53 |

OTHER REFERENCES

Stephenson et al., Jour. Chem. Physics, 21, p. 1110 (1953).
23—53, 302

Ferrari et al., Gazz. Chim. Ital., 86, 1174–80 (1956).

NORMAN YUDKOFF, Primary Examiner

R. T. FOSTER, Assistant Examiner